United States Patent
Quer et al.

(10) Patent No.: US 9,176,165 B2
(45) Date of Patent: Nov. 3, 2015

(54) VIBRATING MICRO-SYSTEM WITH AUTOMATIC GAIN CONTROL LOOP, WITH INTEGRATED CONTROL OF THE QUALITY FACTOR

(75) Inventors: Régis Quer, Saint Peray (FR); Sébastien Simoens, Lyons (FR); Pierre-Olivier Lefort, Valence (FR)

(73) Assignee: Thales, Neuilly sur Seine (FR)

( * ) Notice: Subject to any disclaimer, the term of this patent is extended or adjusted under 35 U.S.C. 154(b) by 554 days.

(21) Appl. No.: 13/540,773

(22) Filed: Jul. 3, 2012

(65) Prior Publication Data
US 2013/0008226 A1 Jan. 10, 2013

(30) Foreign Application Priority Data
Jul. 8, 2011 (FR) ..................... 11 02157

(51) Int. Cl.
G01P 15/09 (2006.01)
G01P 15/097 (2006.01)
G01L 9/00 (2006.01)
G01C 19/5776 (2012.01)

(52) U.S. Cl.
CPC .......... *G01P 15/097* (2013.01); *G01C 19/5776* (2013.01); *G01L 9/0008* (2013.01)

(58) Field of Classification Search
CPC .... G01P 15/097; G01C 19/576; G01L 9/0008
USPC .......... 73/649, 654, 702, 704, 865.9, 514.29, 73/504.13
See application file for complete search history.

(56) References Cited

U.S. PATENT DOCUMENTS

| 4,629,977 A * | 12/1986 | English .................... 324/76.51 |
| 4,785,419 A * | 11/1988 | Huffman ..................... 702/106 |
| 2003/0137216 A1 * | 7/2003 | Tamayo de Miguel et al. ........................... 310/311 |
| 2005/0109080 A1 * | 5/2005 | Hok ............................. 73/24.01 |
| 2008/0184804 A1 | 8/2008 | Leverrier et al. |

OTHER PUBLICATIONS

Preliminary Search Report, FR 2201257 dated Feb. 16, 2012, 8 pages.

(Continued)

*Primary Examiner* — Laura Martin
*Assistant Examiner* — Rose M Miller
(74) *Attorney, Agent, or Firm* — Michael J. Donohue; Davis Wright Tremaine LLP

(57) ABSTRACT

A micro-system, for example a micro-sensor, includes a resonator 10 with vibrating element(s) 11 receiving an excitation signal E of a loop 20 for automatic gain control, as a function of an amplitude setpoint (C) and providing as output a signal y(t) defined by a peak amplitude having a nominal value $A_0$ dependent on the said setpoint and a resonant frequency. The micro-sensor integrates a circuit for measuring a quality factor of the resonator based on a measurement of an attenuation of the output signal during a momentary phase of cutoff of the excitation signal E applied to the resonator. This circuit for measuring the quality factor is configured so as to activate the excitation signal cutoff phase, for a duration of cutoff $T_d$ such that at the end of the cutoff phase, the peak amplitude of the output signal is attenuated by factor to the nominal peak amplitude $A_0$ at the start of the cutoff phase, by a factor k with $1 < k \le 2$.

14 Claims, 4 Drawing Sheets

(56) References Cited

OTHER PUBLICATIONS

Mathias, Herve et al., "Architecture for Integrated MEMS Resonators Quality Factor Measurement," DTIP of MEMS and MOEMS: Design, Test, Integration and Packaging of MEMS/MOEMS 2007: Symposium on Design, Test, Integration and Packaging of MEMS/MOEMS) EDA Publ., Grenoble, France; STRESA, Lago Maggi.

Zhang, M. et al., "CMOS offset-free circuit for resonator quality factor measurement," The Institution of Engineering and Technology Journal, 46(10):706-707, 2010.

* cited by examiner

VIBRATING MICRO-SYSTEM WITH AUTOMATIC GAIN CONTROL LOOP, WITH INTEGRATED CONTROL OF THE QUALITY FACTOR The field of the invention is that of vibrating micro-systems, and notably but not exclusively micro-sensors, whose measurement principle is based on the frequency of oscillations of an oscillating mechanical system, employing beam(s) or membrane(s), formed by means of micro-machined electro-mechanical structures termed MEMS.

The invention applies more particularly to precision sensors, such as those embedded on board aircraft and used for guidance or as an aid to piloting, providing indications of pressure, acceleration or angular rate. These sensors must provide a measurement whose precision must be known at each instant, since they serve for functions that are critical or essential in respect of the safety or the mission of the aircraft. One of the parameters which comes into the precision of measurement is the quality factor of the resonator or resonators.

PRIOR ART

Micro-sensors with vibrating resonator(s) are microstructures based on materials such as quartz and silicon, which comprise one or more vibrating resonators, typically a vibrating beam or blade, enclosed in a chamber with controlled atmosphere, typically under vacuum.

These microstructures are highly valued since they are obtained by collective methods of fabrication using the customary steps for fabricating electronic integrated circuits, and allow the fabrication of very small and inexpensive components.

The well-known principle of the measurement is as follows: a particular mode of resonance of the vibrating resonator is used, controlled by an excitation circuit comprising an automatic gain control loop. An external physical quantity applied to the vibrating resonator is thus converted into a variation of the resonant frequency or a variation of the amplitude of the vibratory motion. This variation in resonant frequency or in amplitude allows a measurement of the stress applied.

Pressure micro-sensors, micro-accelerometers, or else micro-gyrometers as notably described respectively in patent applications FR 0215599, FR 9202189 and FR 0507144 are manufactured on this principle.

FIG. 1 very schematically illustrates the functional elements of a micro-sensor. A resonator 10 with vibrating element(s) 11 is included in a closed automatic gain control loop 20. The loop 20 typically comprises a signal detection circuit 21, and an automatic gain control CAG circuit 22. The detection circuit 21 typically comprises a signal amplifier and a bandpass filter, and is characterized by a gain $G_d$. This detection circuit 21 detects an electrical signal, representative of the oscillation of the resonator, for example a current, and provides as output a corresponding electrical signal y(t), after filtering and amplification, representative of the oscillating motion of the resonator.

This electrical signal y(t) and an external amplitude setpoint C are applied as inputs to the automatic gain control circuit 22, which provides as output a corresponding electrical excitation signal E, applied to the resonator. The circuit 22 and the setpoint C are designed to make the vibrating element (or the vibrating elements) of the resonator oscillate with a predetermined oscillation amplitude $A_0$.

In the absence of any stress, for example under vacuum for a pressure sensor, or in the case of zero acceleration for an accelerometer, the vibrating element oscillates at a resonant frequency $f_0$ when unloaded. In the case of stress, the resonant frequency will vary. It is this difference in frequency which is the basis of the measurement. The measurement is in practice provided by a signal processing device 30, generally a digital processing system which samples the signal y(t) and which analyses it by any known technique so as to determine the resonant frequency $f_a$ thereof, and provide the corresponding measurement M of the physical stress sought (pressure, frequency, angular rate), on the basis of the variation between the frequency $f_a$ measured, and the resonant frequency $f_0$ without stress.

For the fields of application indicated above, the sensors must be very efficacious in terms of sensitivity, precision and scale factor. The guarantee of the precision of the measurement of a micro-sensor is tightly linked to the maintaining of a vacuum in the sensor. These sensors are also designed so that the associated quality factor is very high, of the order of a few tens of thousands ($10^4$) to several million ($10^6$). Such performance is attained by using the rules of the art in regard to techniques of packaging under strong vacuum for the fabrication of these micro-sensors.

Under operational conditions, the structure of the micro-sensors may deteriorate. Notably a partial loss of vacuum in the sensor may occur, inducing a loss of precision in the measurement, that the user has no means of detecting. This is a major drawback of these micro-sensors. In fields such as that of avionics, it is indeed paramount to know at any moment whether or not the measurement provided is reliable.

Thus it must be possible for the performance of a micro-sensor to be able to be monitored while it is operational.

A quantity which provides information indicative of a drift of the performance of the micro-sensor is the quality factor. As illustrated schematically in FIGS. 2a and 2b, a decline in the quality factor connotes a loss of precision in the measurement, or indeed a dropout of the loop. Typically when the quality factor becomes less than a determined threshold $Q_{th}$, the sensor drops out.

Thus the monitoring of the quality factor during the operation of the sensor is a paramount operation for all applications such those of avionics, where the measurements provided by these sensors serve for critical functions of the apparatus in which they are embedded.

The European patent application published under No. EP1831663 teaches such monitoring. This monitoring consists in measuring the gain of the automatic gain control circuit. This scheme is beneficial in that it does not disturb the operation of the sensor, which continues to deliver its measurement at output. But its major drawback is that it does not make it possible to discriminate a drift of the quality factor which is a parameter of the resonator, from a drift of the gain of the electronics of the sensor. Now, it is very important, notably with diagnostics in mind, to discriminate between failures due to the electronics of the sensor and those of the mechanical structure of the sensor, that is to say of the resonator itself. Indeed, it was seen in conjunction with FIGS. 2a and 2b that the quality factor of the resonator directly and strongly impacts the sensitivity of the sensor.

The scientific publication with the reference ISBN 978-2-35500-000-3, entitled "Architecture for integrated mems resonators quality factor measurement" presented by Hervé Mathias et al, on 25-27 Apr. 2007 at the DTIP symposium (Design, Test, Integration and Packaging), describes another scheme, embeddable, which allows pure measurement of the quality factor of a MEMS resonator, by cutting off the excitation of the resonator, typically by opening the servo-loop which controls the oscillations of the resonator. The resonator passes from a regime of sustained auto-oscillations, to a regime of free oscillations: the amplitude of the oscillations decreases, following a decreasing exponential envelope, whose time constant is proportional to the quality factor of the resonator. As detailed in paragraph 2 "Measurement principle", by assuming that the loop is opened at the moment at which the oscillation amplitude is a maximum, equal to $V_0$, the instantaneous value $V(t)$ of the amplitude of the oscillations is a function of the duration t from the opening of the loop, of the initial value $V_0$ of this amplitude, of the resonant frequency $f_0$ when unloaded, and of the overvoltage factor of the resonator. The measurement of the instantaneous value $V(t)$, at the instant t, therefore makes it possible to trace back to the value of the quality factor.

According to the publication, a difficulty resides in the precision of this measurement. To obtain a precise measurement, it proposes to measure the time required to pass from the initial value $V_0$, on opening the loop, to a fixed value $V_0/k$. According to this publication the choice of k is decisive as regards the precision of the measurement of the quality factor. Furthermore, still according to this publication, it is necessary for the measurement scheme to make it possible to measure quality factors whose values extend over a wide span, corresponding to the various technologies and structure of the resonators available on the market. It thus teaches that by taking a value of k lying between 4 and 8, it is possible to measure the quality factor for a wide range of resonators, with a quality factor measurement error limited to a few percent.

The drawback of this scheme is that in practice, with the advocated values of k, corresponding to an attenuation of the resonator output signal of greater than 6 dB, the resonator servo-loop drops out: the measurement of the sensor is lost. Thus, the scheme described may be used only for auto-testing as described in the publication, that is to say when starting or when powering up the micro-sensor, notably in automobile applications. This scheme cannot be used during a mission, while the sensor is functionally operational.

Thus no known solutions exist which allow monitoring, while functional, of the drift of the quality factor by means of a device integrated into the micro-sensor, without interrupting the operation of the micro-sensor.

The same problem can arise for resonator-based sensors which operate on the principle of a measurement of the amplitude of the vibratory motions rather than on the measurement of the frequency of the oscillations. And this problem can also arise for micro-systems serving as time base (providing an oscillation at very stable frequency) and not as measurement sensor.

SUMMARY OF THE INVENTION

To solve this problem, the invention proposes an integrated device comprising
a resonator with vibrating element(s) placed in an oscillating circuit controlled by a servo-loop, the oscillating circuit providing an oscillation signal at a constant frequency or at a variable frequency representing the measurement of a physical quantity, this oscillation signal serving to formulate an output signal of the integrated device and the output signal representing a time base or a measurement of a physical quantity, with a desired nominal precision,
and a circuit for measuring the quality factor of the resonator configured to perform a measurement of the quality factor during a phase of cutoff of the servo-loop,
characterized in that the output signal of the integrated device is provided even during the cutoff phase, and in that the circuit for measuring the quality factor comprises a sequencing circuit configured to limit to a value $T_d$ the duration of the cutoff phase, the said value $T_d$ being such that at the end of the cutoff phase, the peak amplitude of the oscillation signal is attenuated by a factor k that is less than a limit value $k_0$ for which the time base or the measurement of a physical quantity would no longer be obtained with the desired precision.

Preferably, the value $k_0$ is less than or equal to 2.

In the case where it is sought to make a measurement of a physical quantity, the invention therefore relates to an integrated device for measuring a physical quantity comprising
a micro-sensor comprising a resonator with vibrating element(s) receiving an excitation signal provided with the aid of a loop for automatic gain control as a function of an amplitude setpoint and providing an output signal defined by a peak amplitude having a nominal value $A_0$ dependent on the said setpoint and a resonant frequency, and
a circuit for measuring a quality factor of the resonator configured to perform a measurement of the quality factor during a phase of cutoff of the excitation signal causing a decay of the signal,
characterized in that the circuit for measuring the quality factor comprises a sequencing circuit configured to control a duration $T_d$ of the excitation signal cutoff phase, the said duration $T_d$ being such that at the end of the cutoff phase, the peak amplitude of the output signal is attenuated by a factor k with $1 < k \leq 2$ with respect to the nominal value $A_0$, and to measure the quality factor during the said cutoff phase.

The invention also relates to a method for measuring the quality factor of a vibrating resonator in a micro-system comprising a resonator with vibrating element(s) placed in an oscillating circuit controlled by a servo-loop, the oscillating circuit providing an oscillation signal at a constant frequency or at a variable frequency representing the measurement of a physical quantity, this oscillation signal serving to formulate an output signal of the integrated device and the output signal representing a time base or a measurement of a physical quantity, with a desired nominal precision. The method is characterized in that a measurement of the quality factor is performed during a phase of cutoff of the servo-loop, while providing the output signal of the integrated device, and in that the duration of the servo-loop cutoff phase is limited to a value $T_d$, the said value $T_d$ being such that at the end of the cutoff phase, the peak amplitude of the oscillation signal is attenuated by a factor k that is less than a limit value $k_0$ for which the time base or the measurement of a physical quantity would no longer be obtained with the desired precision.

BRIEF DESCRIPTION OF THE DRAWINGS

FIG. 4b is a magnified view of a portion of the curve represented in FIG. 4a;

DETAILED DESCRIPTION

Let us take as an example a micro-sensor with vibrating element of the beam or membrane type, forming a capacitive resonator with frequency varying as a function of a stress applied along the axial direction of the vibrating element, such as a pressure or an acceleration, and controlled by a servo-loop with automatic gain control, such as for example described in European patent applications Nos. EP 0557216 and EP 1995575.

Figure 3:
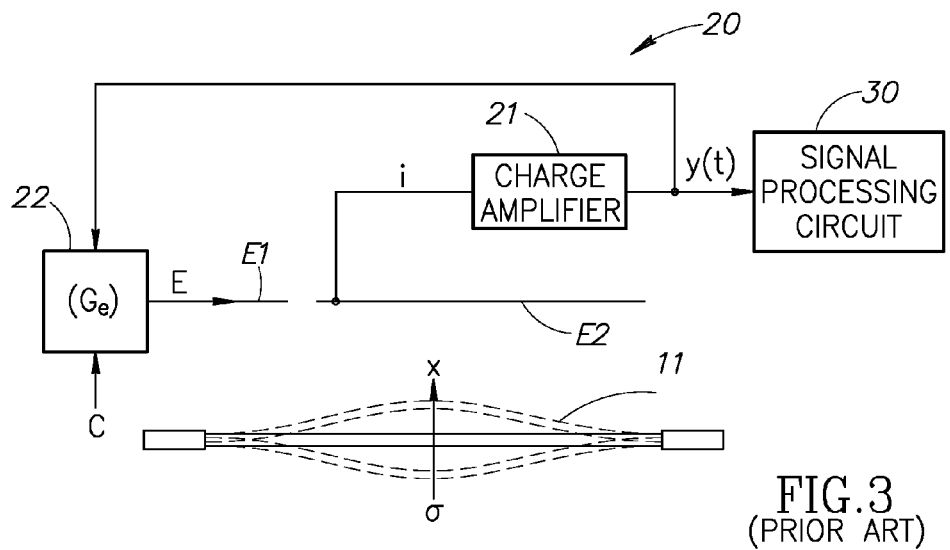
FIG. 3 schematically illustrates the elements of a resonator of capacitive type controlled by an automatic gain control loop in accordance with the prior art.

The simplified block diagram of FIG. 3 illustrates the main elements of this micro-sensor. The capacitive resonator is formed by a vibrating element 11, of beam or membrane type, a detection electrode E2 which overlaps a large part of the length of the vibrating element, and an excitation electrode E1, covering the remainder of the length of the vibrating element, and which receives an excitation signal E.

The vibrating element 11 and the detection electrode E2 form a resonator with variable capacitance: the capacitance value varies thanks to the oscillation of the vibrating element which approaches or recedes from the detection electrode E2. This oscillation is obtained under the effect of the excitation signal E applied to the excitation electrode E1. If E2 is polarized under a DC voltage, a current representative of the variation in capacitance appears thereat. This current i is detected on the detection electrode by the charge amplifier of the detection circuit, which provides a corresponding voltage as output: this is the output signal y(t) of the sensor, which is used by the signal processing circuit 30 to retrieve the stress applied to the sensor, and which is applied as input to the automatic gain control loop 20, making it possible to generate the excitation signal.

The excitation signal E is typically the superposition of a DC voltage and of an AC voltage. It is delivered by the automatic gain control loop. In the example, the detection circuit 21 detects the current i on the detection electrode, and provides as output a DC voltage proportional to the amplitude of the current detected. A CAG automatic gain control circuit 22 delivers the excitation signal E, typically a voltage, as a function of the amplitude of the voltage at the output of the detection circuit and of the amplitude setpoint, which is a predetermined external parameter, dependent on the characteristics and performance of the sensor.

The total gain of the servo-loop 20 is equal to $G_e \cdot G_d$, where $G_d$ is the gain of the detection circuit and $G_e$ the gain of the excitation circuit. If $G_d$ has a known value, dependent on the constituent elements (charge amplifier) of the electronics of the detection circuit 21, the value of the gain Ge is calculated by the automatic gain control circuit 22 as a function of the output voltage of the resonator and of the amplitude setpoint C of the loop.

In the absence of stress, that is to say in an atmosphere in which the pressure corresponds to the internal pressure of the evacuated or reduced atmosphere chamber in which the resonator is placed, and in the steady state, when the servo-loop has brought the resonator's oscillation amplitude to its nominal level $A_0$, the vibrating element oscillates in an axial direction, at a natural resonant frequency $f_0$ of the resonator. Under these conditions, we have: $G_e \cdot G_d = \omega_0/Q$, where Q is the quality factor of the resonator.

Under the effect of an external axial stress σ applied along the x axis as illustrated, the function of the sensor servo-loop being to maintain the peak amplitude of oscillation at a nominal value $A_0$, the resonant frequency will vary. This frequency variation is an image of the stress applied. The new oscillation frequency $f_a$. is linked to the quantity σ as follows:

$$f_a = f_0 \sqrt{1 + \frac{\sigma}{\sigma_C}} \quad \text{(EQ. 1)}$$

where $\sigma_c$ represents a critical buckling stress, a known physical parameter of the resonator.

On the basis of the measurement of the resonant frequency, it is thus possible to trace back to a measurement of the stress σ, $f_0$, and $\sigma_c$ being known.

In the example of a pressure sensor, σ is the image of the exterior pressure exerted along the measurement axis x. For an acceleration sensor, σ would be the image of the exterior acceleration exerted along the measurement axis x.

To perform this measurement of the resonant frequency of the resonator, the non-linear nature of the relation EQ. 1 poses a fundamental problem. Indeed, the stress σ in the relation EQ. 1 contains not only the useful stress applied to the sensor, but also vibration terms that may attain very high values. These vibration terms cause an error at the level of the estimated stress (both a bias and a scale factor error). The level of the vibrations being random, these errors may not be compensated. In practice, the signal processing circuit 30 must implement algorithms making it possible to provide as output the value of the useful stress, corresponding to the resonant frequency of the resonator. Patent application EP 1995575 A proposes for example such a circuit, comprising a frequency analysis system which performs a wideband demodulation of the resonator output signal, so that the estimated stress contains the useful stress and the vibration terms, and the latter are thereafter eliminated by filtering.

This patent applies the representation of the oscillating motion of the vibrating element of the resonator by a one-dimensional equivalent oscillator, in the direction of the sensitive axis, x, of the sensor. In the absence of exterior stress, the position A of the oscillator on this axis x, representative of the amplitude of the oscillation at an instant t, satisfies the following differential equation:

$$\frac{d^2 A}{dt^2} + \frac{\omega_0}{Q} \frac{dA}{dt} + \omega_0^2 \left(1 + \frac{\sigma}{\sigma_C}\right) A + \beta_i A^3 = e(t) \quad \text{(EQ. 2)}$$

where $\omega_0$ (=$2\pi f_0$) is the natural resonant angular frequency of the sensor, and Q, the quality factor of the resonator. The term $\beta_i A^3$ is a $3^{rd}$-order non-linearity term, connoting the variation of the natural frequency of the resonator with vibration amplitude.

These reminders having been given regarding operation and measurement in these sensors with vibrating elements, let us now consider such a resonator under a regime of stabilized oscillation.

Let us now assume that the excitation signal E is cut off: the oscillator passes to the regime of free oscillations and the amplitude of the oscillations decays.

In this decay phase, the position A of the oscillator along the axis x follows an exponential law. The output signal y(t) at the output of the detection circuit 20 may be written:

$$y(t)=A_0 e^{-\xi\omega_0 t}\sin(\omega_0\sqrt{1-\xi^2}t+\phi) \quad \text{(EQ. 3)}$$

where $\xi$, represents the fluid damping, such that $$\xi \triangleq \frac{1}{2Q}.$$

The oscillation in the decay phase is no longer exactly at the angular frequency $\omega_0$ but is reduced by a factor $(1-\xi^2)^{1/2}$. For the micro-sensors with vibrating elements which are the subject of the invention, the quality factor Q is high, at least of the order of $10^4$ or more ($10^5$, $10^6$ . . . ), so that this damping term is in reality very small, negligible.

But more interesting, in this decay phase, the signal decays according to a decreasing exponential envelope $e^{-t/\tau}$, whose time constant $\tau$ is proportional to Q. Indeed we have the following equality $$\tau = \frac{1}{\xi \cdot \omega_0} = \frac{2 \cdot Q}{\omega_0},$$

i.e.

$$Q = \frac{\tau \cdot \omega_0}{2} \quad \text{(EQ. 4)}$$

Thus, if it is possible to measure this time constant precisely under a regime of free oscillations (servo-loop open), a precise measurement of the quality factor Q of the resonator is obtained. This is indeed the quality factor of the resonator itself, since in this measurement, the servo-loop being open, the electronics of the sensor do not intervene at all, and this is indeed what is sought in the invention.

The invention applies this known property, but in a manner which does not cause dropout of the servo-loop, in contradistinction to the teachings of the prior art.

In the invention, the measurement provided by the sensor remains reliable and available while the quality factor is being measured. It is thus possible to ensure real-time monitoring of the quality factor without disturbing the functional operation of the sensor so that the measurement of the sensor and a measurement which advises as regards the reliability of this measurement are both real available in time.

According to the invention, the measurement of the quality factor is carried out by cutting off the excitation signal, the oscillator thus passing to a regime of free oscillations. This cutoff is maintained for a determined duration $T_d$, such that the peak amplitude A of the output signal of the resonator is attenuated by a factor k that is less than a limit value $k_0$. The value $k_0$ is chosen such that it continues to be possible for the measurement of the physical quantity by the sensor to be obtained with the desired nominal precision. Preferably, the value $k_0$ is less than or equal to 2, that is to say $1<k\leq 2$. The excitation signal is then applied again.

Under these conditions of cutoff of the excitation signal, for a delimited duration $T_d$ such that the peak amplitude of the signal is attenuated by a factor at most equal to 2, the signal-to-noise ratio is hardly degraded: cutoff of the excitation signal does not cause any dropout of the servo-loop: the measurement provided by the sensor remains sufficiently precise during the loop opening phase. Ideally k lies between 1.4 and 1.5, that is to say the duration of the opening of the loop corresponds to an attenuation of the peak amplitude of the output signal of the order of 30%: the corresponding degradation of the signal-to-noise ratio of the output signal of the sensor will be of the order of 3 dB, so that the sensor will not drop out and therefore continues to provide a measurement which remains fairly precise. Moreover, the duration $T_d$ of the excitation signal cutoff phase is sufficient to allow precise measurement of the quality factor.

Figure 4A:
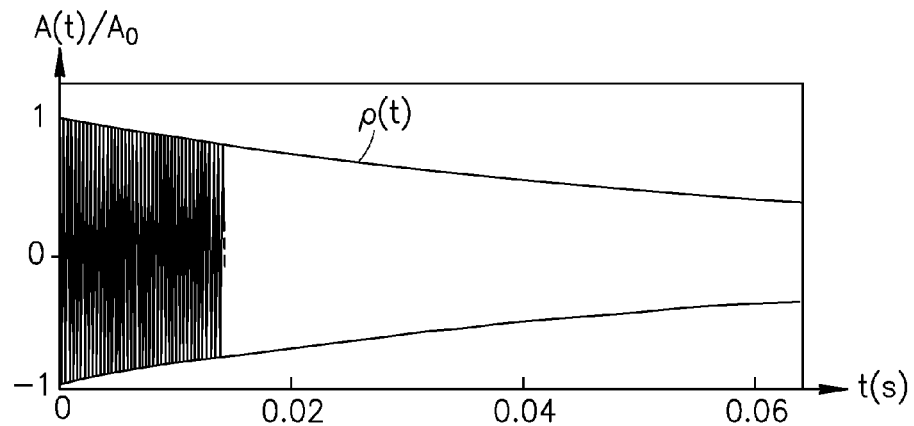
FIG. 4a is a curve as a function of time showing the amplitude attenuation of the output signal of the resonator, by cutoff of the automatic gain control loop excitation signal, and the envelope of this signal.
Figure 4B:
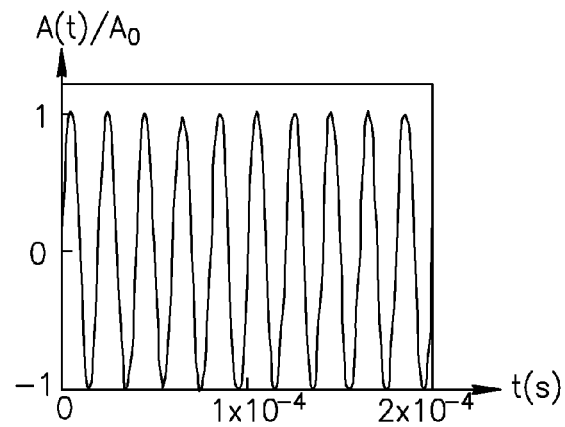

FIG. 4*a* shows a corresponding plot of the corresponding signal y(t), given by equation EQ. 3. More precisely, the figure gives the plot of the envelope $\rho$, that is to say of the instantaneous peak amplitude A of the output signal y(t), for a nominal peak amplitude $A_0$ normalized to 1, a resonant frequency $f_0$ equal to 50 kHz, and a phase shift $\phi$ equal to 0 radians, and an overvoltage factor Q equal to 10000. FIG. 4*b* is a zoom of the start of this decay curve. In this example, the time constant $$\tau = \frac{2 \cdot Q}{\omega_0}$$

is equal =0.064 seconds.

A measurement of the quality factor Q can easily be derived on the basis of the signal y(t) or of its envelope $\rho(t)$.

Figure 5:
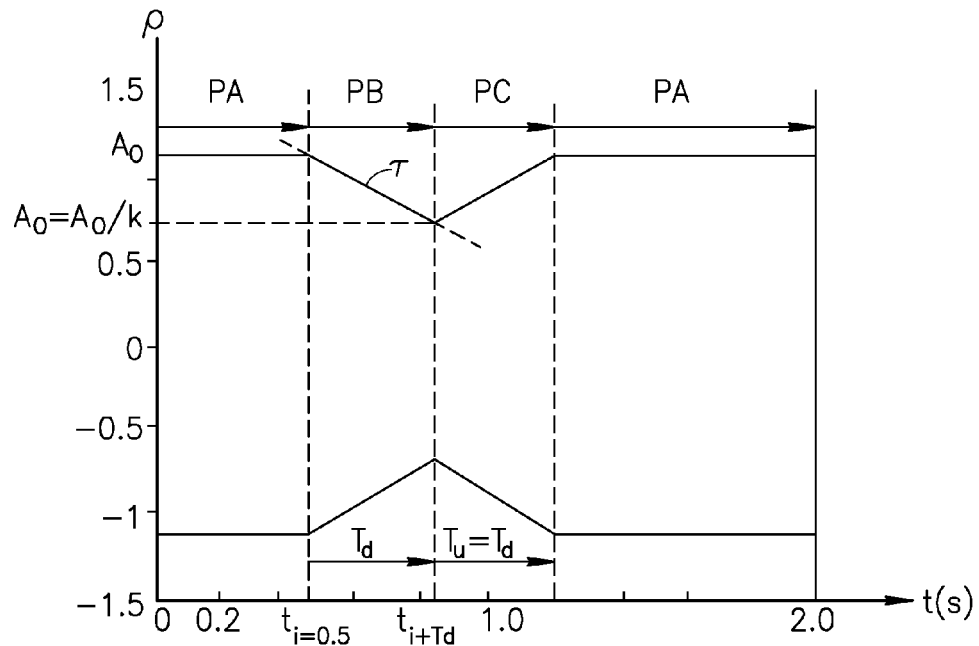
FIG. 5 illustrates the evolution of the envelope of the output signal in the two successive phases of cutoff and restoral of the excitation signal, according to a preferred mode of implementation of the invention.

Before detailing the signal processing implemented to determine the value of the quality factor during the decay phase, let us return to the sequencing of the steps of decay and rise of the amplitude of the output signal y(t), according to the invention, with reference to FIG. 5.

A quality factor measurement sequence according to the invention, is obtained by forcing the resonator to pass from a stabilized oscillation regime PA, controlled by the automatic gain control loop and with reference to an amplitude setpoint C, to a regime of free oscillations PB, by cutting off the excitation signal E, causing partial attenuation, by a predetermined factor k, with $1<k\leq 2$, of the amplitude of the output signal y(t).

The duration $T_d$ of this phase PB is thus dependent on the decay slope of the amplitude of the output signal, and the attenuation factor k chosen over the interval of the reals ]1-2].

At the end of the cutoff phase, i.e. at $t_i+T_d$, if $t_i$ is the instant marking the start of the phase PB, corresponding to cutoff of the excitation signal, the peak amplitude of the signal is equal to $A_0/k$. This phase is followed by the reapplication of the excitation signal E so as to return to the stabilized oscillation regime PA. There is thus a transient phase PC of duration $T_u$, between the end of the phase PB, at the instant $t_i+T_d$, and the return to the stabilized regime, from the instant $t_i+T_d+T_u$. This duration $T_u$ of the transient phase is the time required for the peak amplitude of the resonator output signal to regain its nominal value $A_0$.

The plot of FIG. 5 represents the voltage across the terminals of an analogue-digital converter for a peak amplitude normalized to 1. It thus highlights the decay of this peak amplitude, in the cutoff phase PB controlled at an instant $t_i$=0.5 seconds, and then the rise in this amplitude from the instant $t_i+T_d$, during the rise phase PC, corresponding to a measurement sequence according to one mode of implementation of the invention.

The example illustrated corresponds to the output signal of a MEMS accelerometer (micro-accelerometer) having the following basic characteristics: $f_0$=47 kHz, Q=$10^5$ and an electronic signal-to-noise ratio of 85 dB/Hz. In the example of the measurement sequence illustrated, the factor k is equal 1.66, corresponding to a threshold $A_d$ fixed at 60% of the initial value $A_0$.

The duration $T_d$ of decay is given by the following formula:

$$T_d = -\frac{2Q}{\omega_0} \ln(A_d) \qquad \text{EQ. 5}$$

The numerical application gives $T_d$=0.37 seconds.

Preferably and as represented, in the phase PC of rise of the peak amplitude of the signal, to regain the conditions of the stabilized regime PA, an excitation gain of greater than the excitation gain in the stabilized regime is applied, so that the growth of the peak amplitude until it regains the nominal value $A_0$ of the stabilized regime, is faster, and preferably equal to the duration of cutoff.

As illustrated, $T_u$ is obtained equal to the descent time $T_d$, by applying a gain $G_{e1}$ of the excitation circuit equal to twice its nominal value $G_{e0}$ satisfying $G_{e0} \cdot Gd = \omega_0/Q$. An excitation gain $G_{e1}$ such that $G_{e1} \cdot Gd = 2\omega_0/Q$ is thus imposed preferably during the rise phase PC.

Advantageously, the repetition of the steps of measurement PB and of rise of the signal PC, makes it possible to follow the evolution over time of the quality factor, without disturbing the operation of the sensor which continues during this time to deliver a measurement of the external stress 6 with the desired nominal precision.

In practice, the cutoff phase PB will advantageously be effected by forcing the amplitude setpoint C of the automatic gain control circuit to zero, this being equivalent to forcing the gain $G_e$ of the circuit 22 of the CAG loop to zero. The amplitude setpoint C being an external parameter typically applied in a sensor initialization phase, provision will then be made for it to be possible to modify this setpoint during operation of the sensor, as a function of the desired sequencing, that is to say to set it to zero (0), so as to trigger the first phase PB of the quality factor measurement sequence, and then resume a nominal value $C_0$, of stabilized regime PA, or preferably a transient value ($C_1$) greater than the nominal value $C_0$ (FIG. 4a), so as to obtain an excitation gain $G_{e1}$ of the rise phase PC, making it possible to rapidly regain the stabilized regime. Preferably the value $C_1$ is chosen so as to exactly compensate the damping of the cutoff phase PB. The scheduler can apply the nominal setpoint value $C_0$, as soon as the output signal regains its initial peak amplitude $A_0$: the resonator is again in the phase PA of stabilized regime of forced oscillations. It is noted that the value $T_u$ is not involved in the measurement of Q. It is simply sought to optimize it so as to regain the stabilized regime PA as rapidly as possible.

The control of the duration $T_d$ may be carried out for example by comparing the relative level of the envelope ρ(t) of the output signal y(t) with the threshold $A_d$. One then obtains Q directly by applying the equalities seen previously, with a measurement precision which may easily be less than 1%.

It is also possible to pre-calculate the value $T_d$ corresponding to the predetermined threshold $A_d$, on the basis of a thermal model of the quality factor. This requires an external temperature sensor, which provides a measurement of the temperature, and the corresponding value Q is determined on the basis of the thermal model. The value $T_d$ is then given the formula EQ. 7. Means for counting down this duration $T_d$ are then provided, so as to determine the end of the cutoff phase. The excitation signal is applied again.

In the case where the assumption is made that the amplitude decays linearly during the cutoff phase, it is then possible, returning to FIG. 5, to consider that it is possible to make a direct measurement of Q by measuring the decay slope over the duration of cutoff $T_d$, by using the following two formulae:

$$\tau = 2Q/\omega 0 \qquad \text{EQ. 6 and}$$

$$\tau = (A_0 T_d)/(A_0 - A_d)). \qquad \text{EQ. 7.}$$

Notably, if a detector of the envelope ρ(t) of the resonator output signal is available, it is known how to determine the amplitudes $A_0$ and $A_d$ corresponding to the peak amplitude at the start, and at the end of the cutoff phase according to the invention. The detection of passage under the threshold $A_d$ gives the value of $T_d$, or else $T_d$ is pre-calculated However, in practice, use is preferably made of signal processing techniques suited to noisy environments and making it possible to circumvent errors of bias and of scale, in order to measure the quality factor in accordance with the principle of the invention.

Advantageously, a scheme is used which makes use of the teachings of European patent application published under the number EP 1995575 and which uses a device for calculating the frequencies which allows correct measurement of the oscillation frequency of the vibrating element in a disturbed environment. The text of this patent application may usefully be referred to for all the details relating to this calculation device. To summarize, this frequency analysis system is based on the use of the Hilbert transform of a function U representative of the position A of the resonator.

The function U corresponds to the envelope ρ(t) of the signal y(t) at the output of the resonator, applied as input to an analogue-digital converter, and represents the instantaneous position of the resonator along the x axis (FIG. 3). The signal digital processing circuit then comprises an envelope detector 50 (FIG. 7), and means 60 making it possible to carry out the Hilbert transform of the function U, denoted V, and a function equal to $U^2 + V^2$ which is mathematically equal to the square of the envelope, denoted $\rho^2$.

Figure 1:
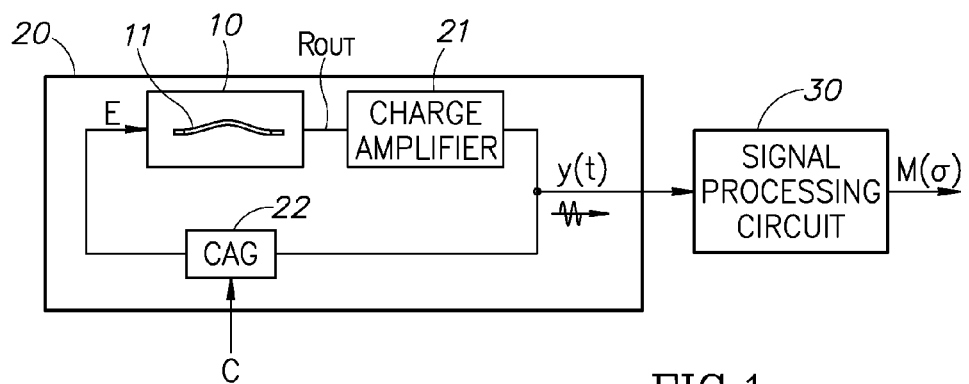
FIG. 1 already described is a simplified diagram of a measurement micro-sensor with resonator(s) with vibrating elements(s), with excitation control by automatic gain control loop.
Figure 2A:
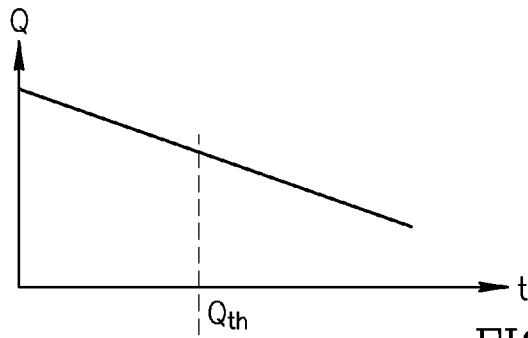
FIGS. 2a and 2b illustrate the relation which links quality factor and precision of measurement of a micro-sensor with resonator with vibrating element(s)
Figure 2B:
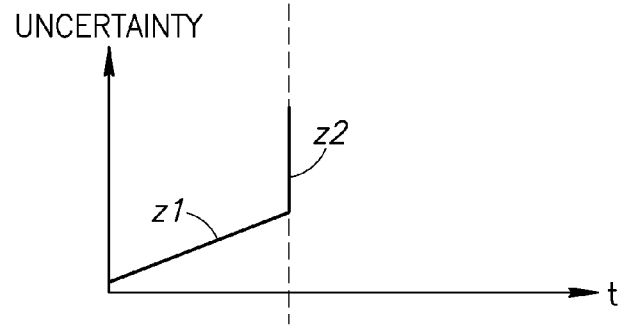
Figure 6:
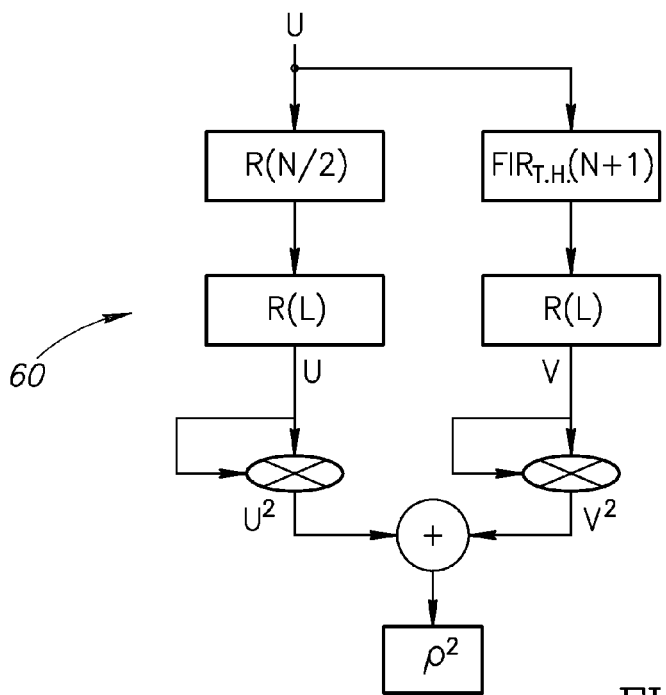
FIG. 6 represents a schematic for calculating the square of the envelope of the output signal, making use of the Hilbert transform allowing direct measurement of the quality factor.

The calculation means 60 are illustrated in FIG. 6 which borrows from FIG. 2 of patent EP1 995 575, the calculation elements which are useful in the measurement of the quality factor, which is what interests us here. This practical embodiment does not pose any particular problems of implementation. The various electronic elements which are each represented by a rectangle in this figure, are as follows:

a finite impulse response filter denoted $FIR_{TH}$ with N+1 points, whose spectral band includes the spectral lines of amplitude indicative of the signal U, thus calculating the Hilbert transform of the signal U;

delay lines denoted R(N/2), making it possible to synchronize the signals U and V, by delaying the signal U by N/2 points;

two multipliers making it possible to calculate the square of the signal U and of the signal V, a summator calculating the function $U^2 + V^2$.

In the example, other delay lines denoted R(L) of L points are designed to delay the signals U and V, so that they are synchronous with other signals (not illustrated here) used in the EP patent application. These delay lines are indicated as dashed lines. They are not necessary for calculating the function $U^2 + V^2$.

The square of the envelope $\rho^2$ is thus readily available. Now, the theoretical expression for the square of the envelope, $\rho^2$, during the decay phase is $$\rho^2 = Ke^{-\frac{\omega_0}{Q}t},$$

with K a constant.

It is thus possible to estimate Q by linear regression on $\ln(\rho^2)$ during the decay phase.

In this example, as the envelope of the resonator output signal is available, the end of the cutoff phase will be detected by comparing the relative level of the envelope with the threshold $A_d$.

It is further possible to use another measurement scheme which remains satisfactory in terms of precision, in particular if an envelope detector is not available. In this scheme, the duration $T_d$ of the cutoff phase will be calculated beforehand according to the thermal model of the quality factor for the sensor considered, and counted down so as to determine the end of this cutoff phase, as indicated previously.

It is then possible to estimate Q on the basis of the signal U, by estimating the peak amplitude $A(t_0)$ at the start and the peak amplitude $A(t_0+T_d)$ at the end of the decay phase, by detecting spikes of the signal y(t). The estimate of the factor Q is obtained through the general formula:

$$\hat{Q} = \frac{\omega_0 T_d}{2\ln\left(\frac{\hat{A}(t_0)}{\hat{A}(t_0+T_d)}\right)} \qquad \text{EQ. 8}$$

(which is the general formula of the formula EQ. 7 in which we have $A_0$ normalized to 1); the hat on the letters Q and A indicates that these involve estimations of Q and A.

The precision in the measurement of Q remains satisfactory. Indeed, the measurement of the peak amplitude or of the envelope is disturbed by the noise of the sensor, which originates essentially from the charge amplifier (circuit 21). This noise can be modelled as voltage-wise white noise in the band of the resonator.

By performing a 1$^{st}$-order finite expansion of equation EQ. 8 hereinabove, it is seen that the relative precision error in the measurement of Q is Gaussian. Its standard deviation is equal to the inverse of the signal-to-noise ratio (ratio between the peak power and the noise from which 3 dB of differential calculation is deducted). With a threshold $A_d$=0.6, the precision to 1 sigma with this basic scheme is a few percent for a typical sensor. Such precision is sufficient to allow the prevention of faults.

By performing a linear regression, this precision is improved by a factor of greater than 10, since several thousand signal spikes affected by independent noise are observed.

Thus, the invention which has just been described makes it possible to precisely follow the evolution of the quality factor during the functional operation of the sensor. In the case of micro-sensors comprising several vibrating resonators, notably micro-accelerometers based on differential measurement, the quality factor of each of the resonators will be measured according to the principle of the invention.

The repeated measurement of the quality factor according to the invention, and more especially the repeated introduction of the sequence comprising a decay phase followed by a rise phase, does not significantly degrade the performance of the sensor.

Notably, involving as it does the effects of the measurements of the quality factor on the measurement noise, the temporary degradation of the signal-to-noise ratio is 3 dB for a threshold $A_d$=0.7. The effect on the mean performance will depend on the periodicity of these measurements. In an application to fault prevention, it is probably possible to space out the measurements of the quality factor by several minutes, thereby rendering this effect statistically negligible.

Involving as it does the error in the scale factor, a theoretical calculation shows that the presence of 2 non-zero damping term in equation 1 generates a scale factor error of $$\frac{1}{2hQ^2}$$

during the growth and decay phase, where h is the scale factor. This term is negligible for pressure sensors and for accelerometers, having regard to the order of magnitude of Q ($10^4$ and more). It is for example less than 0.1 µg/g for accelerometers.

Involving as it does the effect of the cubic non-linearity in stiffness of the resonator, it is recalled that a resonator possesses a cubic non-linearity (of mechanical or electrostatic origin) in stiffness, which is manifested by an additional term $$\frac{h_{nl}}{m_r}A^3$$

in equation 1 with $h_{nl}$, the cubic non-linearity error, in N/m/m$^2$ and $m_r$ the mass of the resonator in kg. This non-linearity is manifested in the measurement σ by a bias equal to $$\frac{3}{8h\omega_0^2}\frac{h_{nl}}{m_r}\rho^2$$

with ρ the envelope of the signal y(t). The value of this bias for the nominal amplitude of oscillation—which is about 1 mg for a micro-accelerometer and about $9.10^{-3}$ hPa for a pressure micro-sensor—is suppressed by calibration of the sensor. The measurement of the overvoltage, by causing the envelope to fluctuate, will create an error whose maximum value is attained at $t_0+T_d$ and then equals $$\frac{3}{8h\omega_0^2}\frac{h_{nl}}{m_r}(1-A_d^2)\rho^2$$

on each of the pathways. In an accelerometer which uses two differential-mounted resonators, this error in-run will be suppressed to within a few µg by the differential combination. The bias in-run is obtained by integrating the error over time. If the relative duration of the quality factor measurement phases according to the invention is 1%, the bias on a pathway will be reduced to less than 10 µg for the accelerometer even before the differential combination which will totally cancel it. For a pressure sensor having a resolution of 0.03 hPa. it can be shown by calculation that the maximum error in the measurand provided by the sensor at $t_0+T_d$ is typically of the order of a few thousandths of an hPa before integration over time, this being negligible compared with the resolution of the sensor.

However, if it is desired to correct this source of error, it is possible to correct it totally by processing, by adding a corrective term $a\rho^2$ to the measurement of $\sigma$ with a coefficient a determined by calibration. It is also possible to cancel the bias without modifying the sensor processing, either by calibrating the sensor over a duration equal to the period of refreshing of the measurement of the overvoltage, or by very slightly increasing the nominal amplitude during functional operation so as to keep the mean value of $\rho^2$ constant with respect to that during calibration.

In conclusion, the measurement of the quality factor Q during operation by the scheme of the invention may be performed without degrading the performance of the sensor.

This measurement makes it possible to determine the evolution of other characteristic parameters of the sensor.

Notably, as soon as the phase PA of stabilized regime is regained following a quality factor Q measurement sequence, the gain of the servo-loop satisfying the equation $G_e \cdot Gd = \omega 0/Q$, and obtains a measurement of the gain of the loop for the nominal amplitude setpoint ($C_0$). Just as it is possible to follow the evolution of the quality factor during the operation of the sensor, it is therefore also possible to follow the gain of the loop.

Moreover, the quality factor depends on the temperature of the resonator, and a corresponding factory-measured thermal model is available for a given sensor.

Thus, the measured value of Q, makes it possible, by comparison with the thermal model linking the value of Q, to a temperature, to provide resonator temperature information, which may optionally be compared with the temperature provided by a temperature probe.

These various measurements advise regarding the state or the conditions of use of the sensor.

Figure 7:
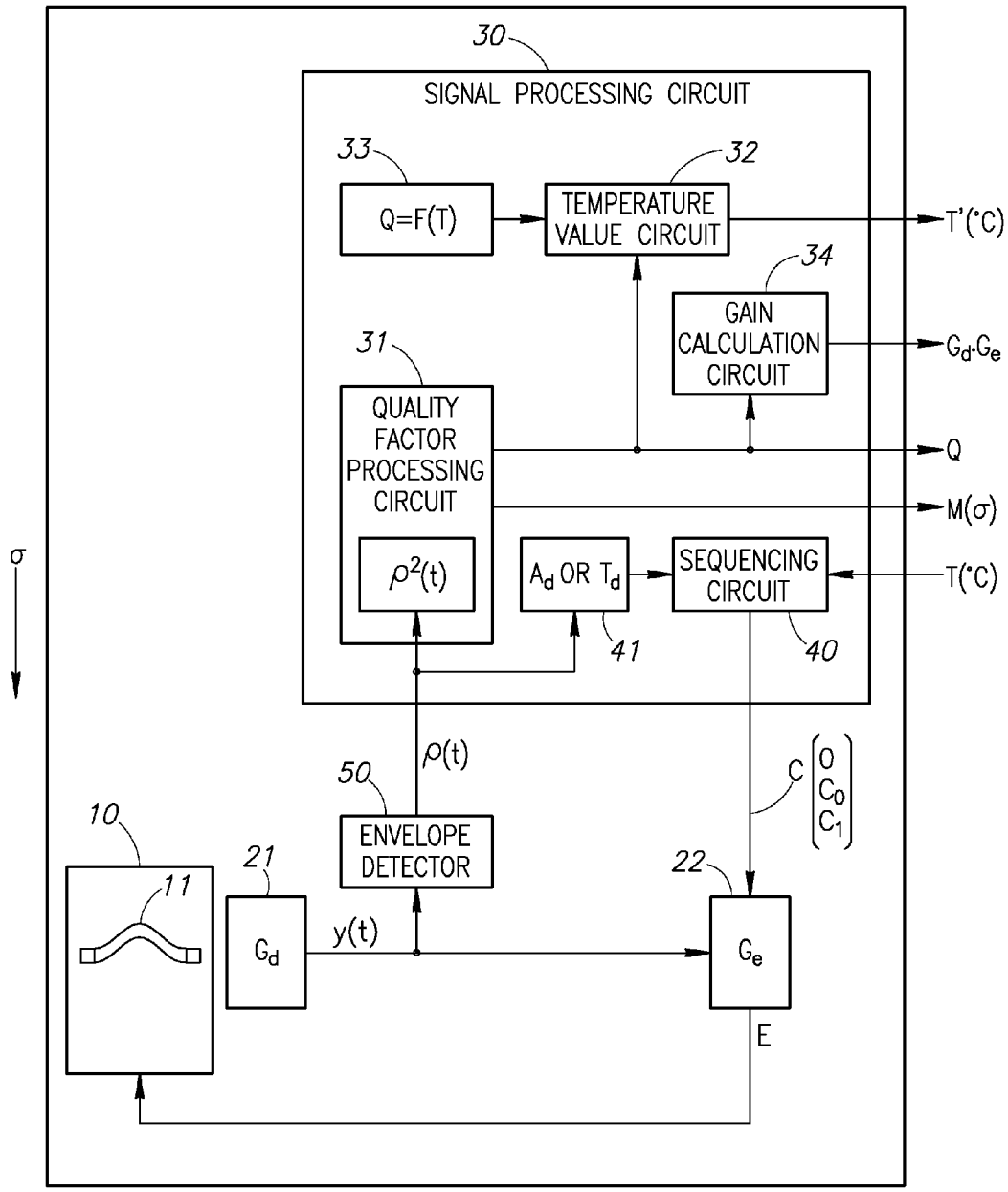
FIG. 7 is a block diagram of an integrated measurement device in a corresponding exemplary implementation of the invention.

FIG. 7 illustrates an implementation of the invention by means of a sequencer 40, which triggers the quality factor measurement sequences by providing the corresponding values of the amplitude setpoint of the automatic gain control loop: 0, to control the cutoff of the excitation signal; $C_0$ or $C_1$, depending on whether the initial values of amplitude setpoint are restored, or whether it is sought to regain the stabilized regime more rapidly.

More particularly the application of the setpoints $C_0$ or $C_1$, after the cutoff phase is activated by the circuit 41 for detecting the end of the cutoff phase.

In this exemplary implementation, a sensor temperature measurement T is provided by an external sensor, making it possible to calculate the value of the duration $T_d$ of cutoff, as explained previously by determining a corresponding value Q, obtained in the factory, on the basis of a thermal model 33 of the quality factor, stored in the circuit 30, so as to calculate the formula given by EQ. 5. The value $T_d$ thus calculated can then be used for the detection by a circuit 41, of the end of the excitation signal cutoff phase.

The detection of the end of the cutoff phase by the circuit 41 can further use a comparison of the level of the envelope $\rho(t)$ with the predetermined threshold $A_d$.

The thermal model 33 of the quality factor Q, can further be used by a temperature value circuit 32 to provide a temperature value T' as output, corresponding to the value measured during a cutoff phase according to the invention, of the quality factor.

Finally, a measurement of the gain of the servo-loop $G_d G_e$ is also calculated by a circuit 34, on the basis of the value of Q measured during a cutoff phase according to the invention, on the basis of the formula $G_{e0} \cdot Gd = \omega 0/Q$.

These additional measurements T' and $G_e G_d$ as a function of the value of Q measured according to the invention, may be used thereafter in a system for general analysis of the evolution over time of the characteristic parameters of the sensor.

Finally, the measurement of the quality factor Q during the cutoff phase is carried out by a signal processing circuit 31 suited to the technique adopted for analyzing the resonator output signal.

For example, and as illustrated, an envelope $\rho(t)$ detection circuit is provided, and the circuit 31 comprises the calculation elements of the figure, for calculating the square of the envelope, (t), and then calculating the value of Q by linear regression of $\ln(\rho^2)$ over the duration $T_d$ of the cutoff phase.

Other techniques may be used, and notably direct techniques for measuring the decay slope, or by estimates, as described previously.

The invention applies to all micro-sensors comprising a resonator or several resonators with vibrating element(s), and to micro-sensors of diverse mechanical structures.

It applies notably to micro-sensors which comprise at least two resonators making it possible to apply differential measurement techniques, making it possible to compensate for certain errors of the electronics. The invention applies to the measurement of the quality factor of each of these resonators.

The invention claimed is:

1. Integrated device comprising:
a resonator (10) with vibrating element(s) (11) placed in an oscillating circuit controlled by a servo-loop, the oscillating circuit providing an oscillation signal at a constant frequency or at a variable frequency representing the measurement of a physical quantity, this oscillation signal serving to formulate an output signal of the integrated device and the output signal representing a time base or a measurement of a physical quantity, with a desired nominal precision;
and a circuit (31) for measuring a quality factor of the resonator configured to perform a measurement of the quality factor during a phase of cutoff of the servo-loop; and
wherein the output signal of the integrated device is provided even during the cutoff phase, and the circuit for measuring the quality factor comprises a sequencing circuit (40) configured to limit a duration of the cutoff phase (PB) of the servo-loop to a value $T_d$, the said value $T_d$ being such that at the end of the cutoff phase, the peak amplitude of the oscillation signal is attenuated by a factor k that is less than a limit value $k_0$ for which the time base or the measurement of a physical quantity would no longer be obtained with the desired precision.

2. Integrated device according to claim 1, wherein $k_0$ is less than or equal to 2.

3. Integrated device according to claim 1, wherein the resonator receives an excitation signal (E) provided by the servo-loop (20) for automatic gain control as a function of an amplitude setpoint (C), and provides an output signal y(t) defined by a peak amplitude having a nominal value $A_0$ dependent on the setpoint and on a resonant frequency, the excitation signal being cut off by the sequencing circuit during the cutoff phase.

4. Integrated measurement device in accordance with claim 3, in which the sequencing circuit (40) causes the cutoff of the excitation signal, by forcing the amplitude setpoint (C) of the automatic gain control loop to zero.

5. Integrated measurement device in accordance with claim 4, in which the sequencing circuit (40), at the end of the duration of cutoff $T_d$, applies a nonzero amplitude setpoint, which is equal to a nominal value ($C_0$) or to a greater value ($C_1$) than the said nominal value ($C_0$).

6. Integrated measurement device in accordance with claim 5, in which the sequencing circuit (40), at the end of the duration of cutoff $T_d$, applies an amplitude setpoint having a greater value ($C_1$) than the said nominal value ($C_0$), for a duration (Tu) substantially equal to the duration of cutoff $T_d$, the said setpoint value ($C_1$) being such that the gain of the automatic gain control loop is double the gain obtained for the said nominal setpoint value, and then restores the amplitude setpoint to its nominal value ($C_0$).

7. Integrated measurement device according to any of the preceding claims 3 to 6, comprising means (50) for detecting the envelope ρ(t) of the output signal (y(t)) of the oscillating circuit, and means (31) for calculating the quality factor Q on the basis of the said envelope over the said duration of cutoff $T_d$.

8. Integrated device according to claim 6, comprising means (41) for detecting the end of the cutoff phase by comparing an instantaneous level of the envelope with a threshold $A_d$ equal to $A_0/k$.

9. Integrated device according to any one of claims 3 to 6, comprising means for detecting spikes of the output signal (y(t)), so as to estimate the peak amplitude $A(t_i)$ thereof at an instant $t_i$ corresponding to the start of the cutoff phase, and the peak amplitude $A(t_i+T_d)$ at the instant $t_i+T_d$, where $\omega_0$ is the natural resonant angular frequency of the resonator, where $T_d$ is the duration of the cutoff phase, pre-calculated by means of a thermal model (33) of the quality factor, so as to calculate an estimated value $\hat{Q}$ of the corresponding quality factor, by applying the formula:

$$\hat{Q} = \frac{\omega_0 T_d}{2\ln\left(\frac{\hat{A}(t_i)}{\hat{A}(t_i + T_d)}\right)}.$$

10. Integrated device according to claim 1, comprising means of digital processing (50) of an envelope ρ(t) of the output signal of the resonator, said digital processing means being able to calculate a sum $U^2+V^2$, equal to a square of the envelope $\rho^2$ of the output signal, where a function U represents the envelope ρ(t) and V, a Hilbert transform of the function U, and means for calculating a corresponding quality factor Q, by linear regression of $\ln(\rho^2)$ over the duration of cutoff $T_d$.

11. Integrated device according to claim 4, in which a sequence comprising the cutoff (PB) of the excitation signal for the duration $T_d$ and then a restoral (PC) of the excitation signal, is repeated periodically.

12. Integrated device according to claim 1, in which additional calculation means (34) are designed to calculate a gain $G_d \cdot G_e$ of the servo-loop as a function of the measured quality factor, on the basis of the equality $G_d \cdot G_e = \omega_0/Q$, where $\omega_0$ is the resonant frequency of the resonator in the absence of stress.

13. Integrated device according to claim 1, wherein the value of $T_D$ is pre-calculated on the basis of a thermal model (33) of the quality factor, allowing the provision of a temperature value (T') corresponding to the measured quality factor.

14. Method for measuring the quality factor of a vibrating resonator in a micro-system comprising a resonator with vibrating element(s) placed in an oscillating circuit controlled by a servo-loop, comprising:
 the oscillating circuit providing an oscillation signal at a constant frequency or at a variable frequency representing the measurement of a physical quantity;
 the oscillation signal serving to formulate an output signal of the micro-system and the output signal representing a time base or a measurement of a physical quantity, with a desired nominal precision;
 performing a measurement of the quality factor during a phase of cutoff of the servo-loop, while providing the output signal of the micro-system; and
 limiting the duration of the servo-loop cutoff phase to a value $T_d$, the said value $T_d$ being such that at the end of the cutoff phase, the peak amplitude of the oscillation signal is attenuated by a factor k that is less than a limit value $k_0$ for which the time base or the measurement of a physical quantity would no longer be obtained with the desired precision.

* * * * *